United States Patent Office 3,457,251
Patented July 22, 1969

3,457,251
METAL COMPLEXES OF DIAZO DYESTUFFS
Fritz Meininger, Frankfurt am Main, Germany, assignor to Farbwerke Hoechst Aktiengesellschaft vormals Meister Lucius & Brüning, Frankfurt am Main, Germany, a corporation of Germany
No Drawing. Filed Aug. 24, 1966, Ser. No. 574,536
Claims priority, application Germany, Aug. 28, 1965, F 47,034; Feb. 18, 1966, F 48,473
Int. Cl. C09b 45/26, 45/28, 45/30
U.S. Cl. 260—148                                       7 Claims

ABSTRACT OF THE DISCLOSURE

Complex metal compounds of fibre-reactive disazo-dyestuffs containing 1 or 2 reactive groupings of the formula

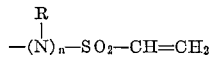

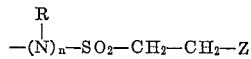

in which R is hydrogen or lower alkyl, Z is —Cl, and
—O—SO$_3$H, —S—SO$_3$H, —N(lower alkyl)$_2$,

—O—SO$_2$—lower alkyl,

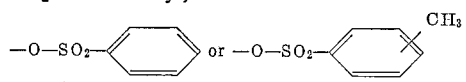

and $n$ stands for 0 or 1, which dyestuffs are suitable for the dyeing or printing of textile materials consisting of fibres of natural or regenerated cellulose, wool, silk or polyamide, the dyeings or prints obtained on such materials being distinguished by a high tinctorial strength.

---

The present invention relates to new, valuable disazo dyestuffs and their complex metal compounds as well as to processes for preparing them; particularly, the invention relates to disazo dyestuffs corresponding to the general formula

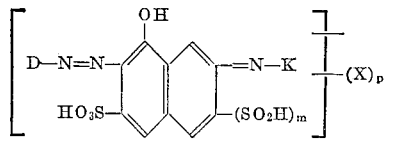

and their complex metal compounds, wherein
D represents the radical of a diazo component of the benzene or naphthalene series which may contain, in o-position to the azo group, a group capable of forming metal complexes or of being converted into a group of this kind under the condition of metallization.
K stands for the radical of a coupling component of the benzen or naphthalene series,
X means a grouping of the formula

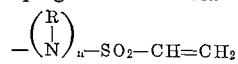

or

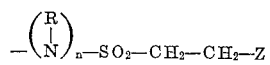

linked to D and/or K in which formulae

R represents a hydrogen atom or a hydrocarbon radical containing 1 to 4 carbon atoms,
Z stands for an inorganic or organic radical, which can be split off by alkaline agents,
$m$ and/or $n$ represent the numbers 1 to 0, and
$p$ represents the number 1 or 2.

The new disazo dyestuffs of the Formula 1 as well as the corresponding complex metal compounds are obtained
(a) By diazotizing an aminoazo dyestuff corresponding to the general formula

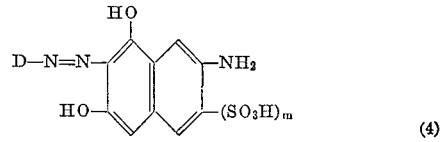

wherein D and $m$ have the aforesaid meanings and by coupling it with a coupling component of the benzene or naphthalene series or
(b) By coupling an azo dyestuff corresponding to the general formula

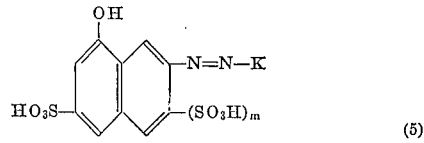

wherein K and $m$ have the aforesaid meanings, with a diazo component of the benzene or naphthalene series, which may contain, in o-position to the azo group, a group capable of forming metal complexes or of being converted into a group of this kind under the conditions of metallization, or
(c) By converting, under the action of an agent yielding metal, an aminoazo dyestuff of the above Formula 4, wherein D represents the radical of a diazo component of the benzene or naphthalene series which, in o-position to the azo group, contains a hydroxyl or carboxyl group, into the corresponding complex metal compound, diazotizing in an acid medium, preferably in a weakly acid medium, for instance in the presence of acetic acid, the complex metal dyestuff thus obtained and coupling it with a coupling component of the benzene or naphthalene series.

When operating in this way, the starting components are selected in such a manner that, in each case at least one of the reaction components used contains a grouping of the Formulas 2 or 3 linked to D and/or to K, and the metal-free disazo dyestuffs obtained according to the methods of operation (a) and (b) are, if desired, converted, under the action of agents yielding metal, in substance or on a substrate, into the corresponding complex metal compounds, or the metal containing disazo dyestuffs obtained according to the methods of operation described sub (c) are, if desired, freed from metal.

For completion of the coupling reaction, it is advantageous to use a small excess, for instance about 1.1 mols of the coupling component per 1 mol of the diazo component.

As radicals Z, which may be split off under the action of an alkaline agent, for instance, the following radicals may be mentioned: A halogen atom, such as the chlorine atom, an alkyl- or arylsulfonic acid ester group as well as an acyloxy group, for instance the acetoxy group, moreover a phenoxy or a dialkylamino group, for instance the dimethyl- or diethylamino group, furthermore the thiosulfuric acid ester group and particularly the sulfuric acid ester group.

The diazo and coupling components used for the preparation of the disazo dyestuffs according to the invention may contain, in addition to one of the groupings (2) or (3) mentioned before, substituents usual in azo dyestuffs, such as halogen atoms, alkyl, alkoxy, nitro, hydroxy, carboxylic acid, amino, acetylamino, benzoylamino, phenylureido and particularly sulfonic acid groups.

As agents yielding metal preferably copper, cobalt and chromium compounds are used. For instance, the corresponding water-soluble salts, such as sulfates, chlorides, acetates, formates and the salts of organic sulfonic acids are appropriate. As groups forming metal complexes are capable of being converted into groups of this kind under the conditions of the metallization, first of all the hydroxyl group, further the carboxyl group and the alkoxy groups are to be mentioned. In the case of cobalt and chromium compounds being used for the metallization, the 1:2 complex metal compound of the dyestuff of the Formula 1 or of the aminoazo dyestuff of the formula 4 are obtained, whereas, when using agents yielding copper, the corresponding 1:1 complex metal dyestuff is formed.

The complex metal compounds obtainable according to method of operation (c) can easily be freed from metal in the manner known per se, whereby metal-free o,o'-dihydroxy-disazo dyestuffs of the Formula 1 mentioned before are formed. These may subsequently be converted into the complex compound or another metal. Thus it is for instance possible to decopper, by means of a sulfide or of a diluted mineral acid, the complex copper compounds obtainable according to the invention and subsequently to convert the metal-free disazo dyestuffs into the complex compounds of chromium or cobalt.

Instead of using diazo or coupling components containing a group of the Formula 3 mentioned before, this group may also be introduced subsequently into the finished disazo dyestuff in the course of a modification of the process of preparation. For instance, a grouping of the Formula 2 present in the disazo dyestuffs obtainable according to the process may be reacted with salts of the thiosulfuric acid, whereby a β-thiosulfato-ethyl-sulfone group is formed. Furthermore, the group of the Formula 2 can be converted into a β-dialkylamino-ethylsulfone group by reaction with a dialkylamine.

On the other hand, dyestuffs containing groups of the Formula 3 may be converted into dyestuffs containing groups of the Formula 2 by treatment with agents showing an alkaline reaction, such as sodium hydroxide.

A further modification of the process consists in that, for the preparation of the disazo dyestuffs of the Formula 1 diazo components or coupling components are used which contain, instead of the groupings 2 or 3 mentioned before, at least one grouping corresponding to the formula $$-\left(\underset{\underset{|}{N}}{R}\right)_n-SO_2-CH_2-CH_2OH \qquad (6)$$

linked to D and/or K wherein R and n have the meanings mentioned before, and that after completion of the coupling the β-hydroxy group is converted into the corresponding sulfuric acid semi-ester group, before or after the metallization of the dyestuffs in substance—according to the method known per se.

In metal-free form or preferably as complex compounds of copper, cobalt or chromium, the disazo dyestuffs obtainable according to the process described before may be advantageously used for dyeing textiles. These new dyestuffs are distinguished by a high tinctorial strength and they are appreciated in the dyeing of wool, silk and polyamide fibers, in which case they may be applied in an acid, neutral or weakly alkaline dyeing-bath. However, they are particularly valuable as "reactive dyestuffs" for dyeing or printing cotton and other natural or regenerated cellulose fibers. For dyeing materials of said kind, the dyestuffs are applied according to printing and dyeing processes together with a treatment with an acid-binding agent, such as sodium hydroxide, sodium carbonate or sodium bicarbonate.

Processes of this kind are nnown from the recent literature (see Melliand Textilberichte 1959, 539, and 1965, 286). According to these processes, above all, cellulose textiles can be dyed deeply navy-blue, blue as well as blue-grey and similar shades having essentially better fastness to washing than, as far as the tint is concerned, comparable dyeings with direct dyestuffs. Amongst the properties of fastness, particularly the good fastnesses to wetting and light as well as the good fastness of the dyeings and prints to dry cleaning are worth being mentioned.

The following examples serve to illustrate the invention but they are not intended to limit it thereto, the parts being by weight unless otherwise stated.

EXAMPLE 1

(a) 23.9 parts of 3-amino-5-hydroxynaphthalene-7-sulfonic acid are dissolved in 200 parts by volume of water while adding 2 N sodium carbonate solution, in order to give a neutral solution. Thereafter, 20 parts by volume of 5 N sodium nitrate solution are added, the solution obtained is dropped on a mixture of 100 parts of ice powder and 20 parts by volume of concentrated hydrochloric acid, and stirred, at 0°–5° C., until entire diazotiazation of the amino component. Subsequently, the batch is adjusted to a pH value of 6.0 by adding 2 N sodium carbonate solution and the suspension formed of the diazo salt is combined with a neutralized solution of 31.9 parts of 1-amino-8-hydroxynaphthalene-2.4-disulfonic acid in 200 parts by volume of water. By introducing sodium carbonate a pH value of 6.0–7.0 is maintained during the coupling reaction. After completion of the reaction, 10 parts of animal charcoal and 10 parts of diatomaceous earth are added to the violet solution, which is stirred, for 15 minutes, at a temperature of 40° C. and filtered. The filtrate is cooled to 5° C. and 25% of potassium chloride (referred to the volume of the solution) are added. The monoazo dyestuff precipitated which in form of the free acid corresponds to the formula

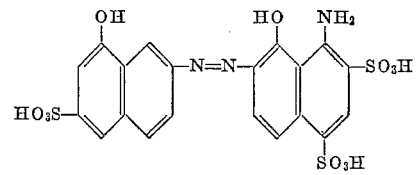

is filtered off and washed with potassium chloride solution.

(b) 33.1 parts of 2-amino-1-methoxybenzene-4-β-hydroxyethylsulfone-sulfuric acid-ester (94% by weight) are diazotized at 0°–5° C. in 200 parts by volume of water and 20 parts by volume of concentrated hydrochloric acid with 20 parts by volume of 5 N sodium nitrite solution. Subsequently, the pH value of the diazonium mixture is adjusted to 6.0 by cautiously adding 2 N sodium carbonate solution.

(c) The moist filter residue of monoazo dyestuff obtained according to (a) is dissolved in 400 parts by volume of water and combined, at 5°–10° C., with the diazo suspension obtained according to (b). The coupling mixture is maintained at a pH value of 6.0–7.0 by introducing sodium carbonate and, after completion of the reaction, 25% of potassium chloride (referred to the volume of the solution) are added to the coupling mixture.

The disazo dyestuff precipitated corresponding in form of the free acid to the formula

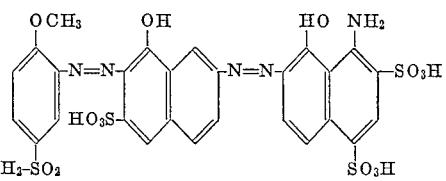

is filtered off and washed with potassium chloride solution.

(d) The moist filter residue of disazo dyestuff obtained according to paragraph (c) is dissolved in 500 parts by volume of water, and 48.5 parts of crystallized sodium acetate and 43.2 parts of crystallized copper sulfate are added to the solution. By dropwise introducing acetic acid, the mixture is adjusted to the pH value of 4.4 and finally it is boiled under reflux for 15 hours.

After cooling of the metallizatiton mixtures 25% of potassium chloride (referred to the volume of the solution) are added, the complex copper disazo dyestuff salted out is isolated by filtration and dried, at a temperature of 60° C., in vacuo.

A very dark blue powder is obtained, which easily dissolves in water, producing a reddish blue solution. In form of the free acid the new complex metal dyestuff corresponds to the following formula:

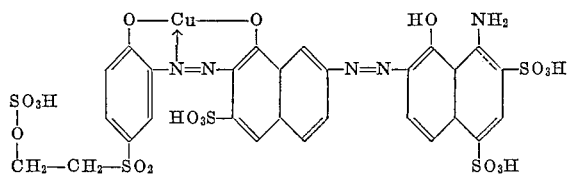

When fixing the product of the present invention on cotton or cellulose, in the presence of alkali, for instance according to the single bath pad-batch process, dyeings of a deep navy blue of good fastnesses to light and washing are obtained.

EXAMPLE 2

(a) 54.2 parts of the aminoazo dyestuff corresponding to the formula

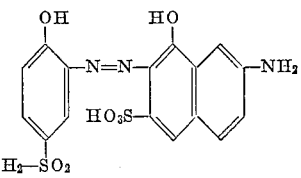

are dissolved, at 80°–90° C., in form of the sodium salt, in 1,550 parts by volume of water, and 20 parts by volume of 5 N sodium nitrite solution are added to the solution. The dyestuff solution obtained is allowed to run, within 2 hours, by stirring thoroughly, into a mixture of 100 parts of ice powder and 70 parts by volume of 5 N hydrochloric acid, while maintaining a temperature of 0°–5° C., if necessary by adding ice. After completion of the diazotization, the mixture is cautiously neutralized with diluted sodium hydroxide solution and then combined, at 5°–10° C., with a neutralized solution of 31.9 parts of 1-amino-8-hydroxynaphthalene-2.4-disulfonic acid in 200 parts by volume of water. The coupling reaction is carried out by introducing sodium carbonate, at a pH value of 6.5 to 7.0. After termination of the coupling, the disazo dyestuff of the formula

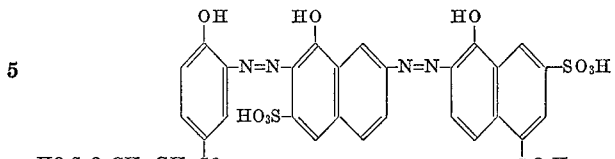

may be salted out with 25% of potassium chloride (referred to the volume of the solution).

After fixing the dyestuff on cotton or cellulose, in the presence of an acid-binding agent—and after a further treatment on the fiber at 50°–60° C., with an acetic solution of copper sulfate—a navy blue dyeing fast to washing is obtained.

(b) For preparing the complex copper compound in substance, the disazo dyestuff obtained according to (a) is isolated, stirred in 1000 parts by volume of water and, at a temperature of 60° C., 30.0 parts of crystallized copper sulfate and 40 parts of crystallized sodium acetate are added. The pH value is adjusted to 5.0–5.5 and the mixture is stirred, for 2 hours, at a temperature of 60° C.

After the completion of the coppering, the complex copper disazo dyestuff may be salted out with about 20% of potassium chloride (calculated on the volume of the batch). The product is identical with the dyestuff prepared according to Example 1, paragraph (d).

EXAMPLE 3

(a) 21.7 parts of 2-amino-1-hydroxybenzene-5-β-hydroxyethylsulfone are slowly introduced into 70 parts of concentrated sulfuric acid and stirred until entire dissolution sets in. Thereupon, the solution is added to a mixture of 140 parts of ice and 27 parts of water and diazotized, at 0°–5° C., with 20 parts by volume of 5 N sodium nitrite solution. Subsequently, the solution of the diazotized amine is cautiously neutralized by adding 60 parts of sodium carbonate.

(b) 23.9 parts of 3-amino-5-hydroxynaphthalene-7-sulfonic acid are dissolved in 100 parts by volume of water, dilute sodium hydroxide solution is added at a pH value of 7.5 and combined with the diazonium salt solution prepared according to (a). Simultaneously, a 2 N-sodium hydroxide solution is allowed to run into the coupling mixture in such a manner that therein the pH value of 7.4–7.5 is maintained. After completion of the coupling, the batch is adjusted to the pH value of 2.0 by adding dilute hydrochloric acid and the dyestuff is salted out with 20% of sodium chloride (referred to the volume of the solution). The monoazo dyestuff salted out is filtered off and washed with sodium chloride solution of a strength of 20% by weight.

(c) The aminoazo dyestuff obtained according to (b) is dissolved in 1000 parts by volume of water by dropwise adding, at a temperature of 60° C., 2 N-sodium carbonate solution, in order to give a neutral solution. 20 parts by volume of 2 N-sodium nitrite solution are added and the solution obtained is dropped, within 2 hours, to a mixture of 200 parts of ice and 30 parts by volume of concentrated hyddrochloric acid. After completion of the diazotization, the diazonium mixture is adjusted to the pH value of 6 by adding solid sodium carbonate and subsequently combined with a neutral solution of 31.9 parts of 1-amino-8-hydroxynaphthalene - 2,4 - disulfonic acid in 200 parts by volume of water. The coupling is completed at a pH value of 6.0–6.5 and the disazo dyestuff formed is salted out with 25% of potassium chloride (calculated on the volume of the solution). The dyestuff is filtered off and washed with potassium chloride solution.

(d) The moist filtration residue thus obtained is dissolved, at a temperature of 50° C., in 800 parts by volume of water, 30 parts of chromium alum and 50 parts of crystallized sodium acetate are added and subsequently the whole is stirred, for 13 hours, at the boiling temperature. Finally, the blue solution is cooled to 5°–10° C. and salted out with 25% of potassium chloride (referred to the volume of the solution). The product formed representing the 2:1 complex chromium compound of the dyestuff corresponding to the formula

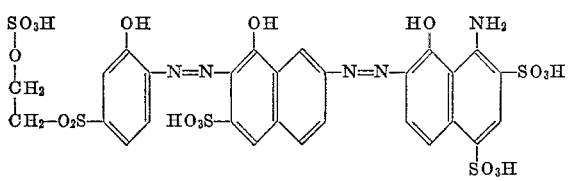

is filtered off, washed with potassium chloride solution and then dried, at 60°–70° C., in vacuo. It represents a dark powder dissolving in water producing a blue solution. When fixing the product on cotton, in the presence of sodium bicarbonate, a blue-grey print is obtained, which is very fast to washing.

EXAMPLE 4

(a) 51.9 parts of the aminoazo dyestuff of the formula

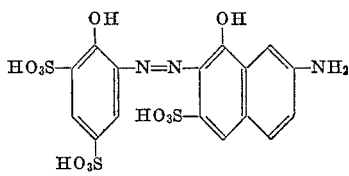

are dissolved, in form of the sodium salt, in 750 parts by volume of water and 21 parts by volume of 5 N-sodium nitrite solution are added to the solution. While thoroughly stirring, the solution obtained is dropped on a mixture of 21 parts by volume of concentrated hydrochloric acid and 200 parts of ice powder. After completion of the diazotization the mixture is combined with a solution of 49.9 parts of 1-vinylsulfonylamino-8-hydroxynaphthalene-3,6-disulfonic acid (di-sodium salt) in 495 parts by volume of water and the coupling mixture is adjusted to a pH value of 6.0-6.5 by introducing sodium bicarbonate. After completion of the coupling the disazo dyestuff formed may be salted out with 25% of potassium chloride (referred to the volume of the solution) after preceding acidification of the solution to a pH value of 1.5.

(b) For converting the disazo dyestuff prepared according to paragraph (a) into the complex copper compound, it is isolated, dissolved at 60° C. in 600 part by volume of water, and 40 parts of crystallized sodium acetate and 25 parts of crystallized copper sulfate are added to the solution. Now the mixture is stirred, for 4 hours, at 75°–80° C., then filtered while still hot and subsequently cooled to 0°–5° C. For isolation of the complex copper dyestuff corresponding, in form of the free acid, to the formula

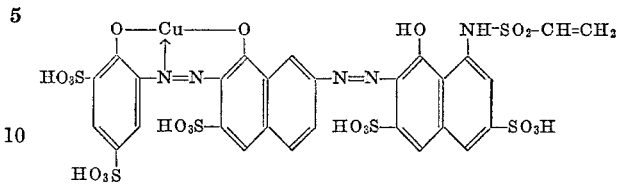

the dyestuff solution is saturated with potassium chloride, stirred, for 5 hours, at 0°–5° C. and subsequently filtered. The product obtained is dried in vacuo at 60°–70° C. and ground. It represents a black blue powder producing on cotton, in the presence of sodium bicarbonate, a navy blue print fast to washing and light.

EXAMPLE 5

(a) 51.9 parts of the aminoazo dyestuff corresponding to the formula

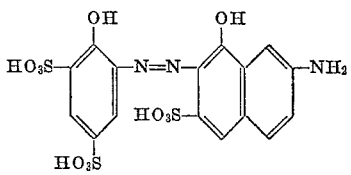

are dissolved, in form of the sodium salt, in 750 parts by volume of water and diazotized as described in Example 4, paragraph (a). The diazo solution obtained is combined with 62.2 parts of the naphthalene derivative corresponding to the formula

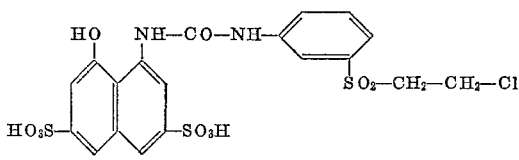

which has been dissolved, in form of the di-sodium salt, in 800 parts by volume of water. By introducing sodium bicarbonate, the coupling is carried out at a pH value of 6.0-6.5. Subsequently, the disazo dyestuff obtained is salted out with potassium chloride, filtered off and washed with dilute potassium chloride olution.

(b) The disazo dyestuff thus obtained in form of a moist filter residue is dissolved at 80° C., in 940 parts by volume of water and converted into the complex copper compound, as described in Example 4, paragraph (b). The new dyestuff corresponding, as free acid, to the formula

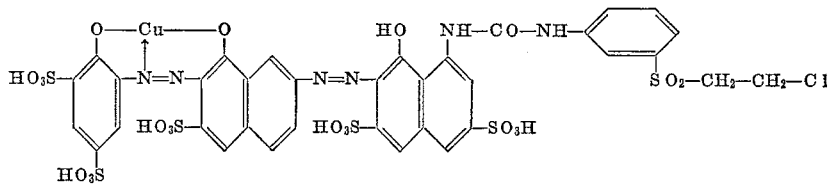

dissolves in water while producing a reddish blue solution and produces on cellulose fibers, in the presence of sodium hydroxide, a full navy blue dyeing, which is fast to light and washing.

EXAMPLE 6

(a) 54.2 parts of the aminoazo dyestuff corresponding to the formula

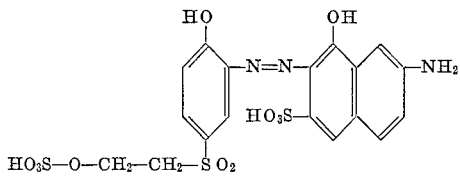

are dissolved in form of the sodium salt, at a temperature of 90° C., in 2000 parts by volume of water. 20 parts by volume of 5 N-sodium nitrite solution are added to the dyestuff solution obtained and the whole is dropped, within 3 hours, on a mixture of 300 parts of ice and 40 parts by volume of concentrated hydrochloric acid. The diazo suspension is stirred, for 7 hours, at 0°–5° C., subsequently adjusted, by means of 2 N-sodium carbonate solution, to the pH value of 3.5 and combined with a solution of 14.3 parts by resorcinol in 200 parts by volume of water. The coupling mixture is maintained at a pH value of 3.5–4.0 by adding sodium carbonate and, after completion of the coupling, 10% of potassium chloride (referred to the volume of the solution) are added. The disazo dyestuff obtained is isolated by filtration, washed with a potassium chloride solution of 10% strength by weight and dried in vacuo at a temperature of 60%.

(b) The disazo dyestuff obtained according to (a) is dissolved in water, while adding, at a temperature of 60° C., 2 N-sodium carbonate solution, in order to give a neutral solution. After addition of 60 parts of chromium alum and 70 parts of crystallized sodium acetate, the mixture is heated under reflux for 22 hours to boiling temperature, then cooled to 60° C. and 10% of potassium chloride (referred to the volume of the solution) are added. The dyestuff formed may be isolated by filtration and washing with diluted potassium chloride solution. After drying in vacuo, at a temperature of 50° C., a dark powder is obtained dissolving in hot water. The 2:1 complex chromium dyestuff prepared corresponds, in the form free of metal, to the formula

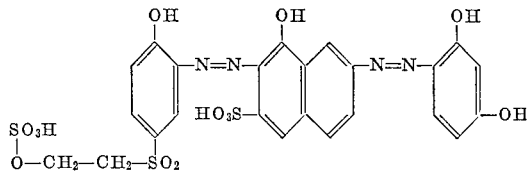

and produces, in the presence of sodium carbonate, on cotton a grey-brown print, which is fast to washing.

EXAMPLE 7

22.8 parts of the monoazo dyestuff prepared according to Example 1, paragraph (a) are introduced, in form of the sodium salt, into a diazo suspension obtained by diazotization of 13.95 parts of 2-amino-1,4-dimethoxy-benzene-5-β-hydroxyethylsulfonesulfuric acid ester (98% by weight) in a mixture of 250 parts by volume of water and 8 parts by volume of concentrated hydrochloric acid with 8 parts by volume of 5 N sodium nitrite solution. The coupling mixture is adjusted to the pH value of 6.0 by adding sodium bicarbonate and maintained at this pH value, by introducing a further amount of sodium bicarbonate, until the reaction ceases.

Subsequently, 10 parts of crystallized copper sulfate and 12 parts of crystallized sodium acetate are added to the violet solution formed and the whole is kept, for 15 hours, at the boiling temperature under reflux. The reddish blue solution is cooled to 0°–5° C. and saturated with potassium chloride, whereby the complex copper dyestuff formed is salted out. The product is filtered off, washed with potassium chloride solution and dried. The new dyestuff corresponding, in form of the free acid, to the formula

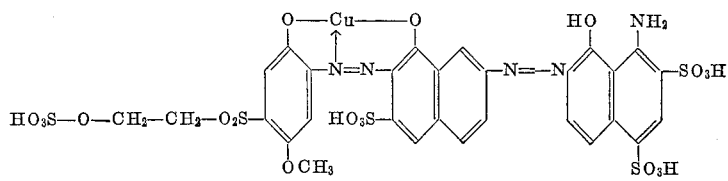

represents a dark brown powder dissolving in water while producing a reddish blue dyeing.

When fixing it on cotton, in the presence of sodium hydroxide, deep navy blue dyeings are obtained, which are very fast to washing and light.

EXAMPLE 8

9.1 parts of 2-amino-1-methoxy-4-methylbenzene-5-vinylsulfone are diazotized, at 0°–5° C., in a mixture of 100 parts by volume of water and 8 parts by volume of concentrated hydrochloric acid with 8 parts by volume of 5 N sodium nitrite solution. After completion of the diazotization, the small excess of nitrous acid is removed by means of aminosulfonic acid. 22.8 parts of the monoazo dyestuff prepared according to Example 1, paragraph (a) are introduced into the diazo suspension obtained. The mixture is adjusted to a pH value of 5.5–6.0 by adding sodium carbonate and the whole is kept at this pH value, by introducing further sodium carbonate, until entire coupling is reached.

The preparation of the complex copper compound is carried out according to the directions given in Example 7. The product may be isolated by salting it out with potassium chloride. A dark blue powder is obtained which is soluble in water while producing a reddish blue tint. The dyestuff corresponding, in form of the free acid, to the formula

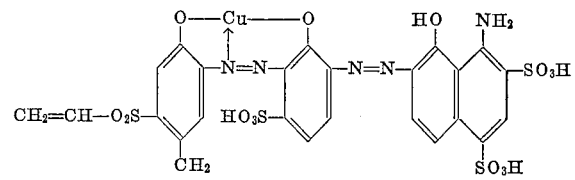

produces, in the presence of sodium carbonate, on cotton prints of a very intense navy-blue tint which are very fast to dry cleaning and light.

EXAMPLE 9

56.9 parts of the aminoazo dyestuff corresponding to the formula

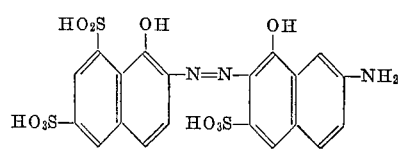

are dissolved, at 50°–60° C., in form of the sodium salt, in 500 parts by volume of water and 20 parts by volume of 5 N sodium nitrite solution are added. The solution obtained is allowed to run, within 30 minutes, into a mixture of 200 parts of ice powder and 20 parts by volume of concentrated hydrochloric acid, whereby care is taken, if necessary by external cooling, that the temperature does not exceed 5° C. The diazonium mixture is stirred for 3 hours at 0°–5° C. and the nitrous acid in excess is removed by adding amidosulfonic acid. The pH value of the mixture is adjusted to 6.5 by adding sodium carbonate, and 150.5 parts of 1-[4'-(N-methyl-β-chloroethyl-sulfonylamino)-benzoylamino] - 8 - hydroxynaphthalene-3,6-disulfonic acid (38% by weight) are introduced as disodium salt into the solution of the diazonium salt. By dropwise adding diluted sodium carbonate solution, the coupling mixture is kept at a pH value of 6.5–7.0. After completion of the coupling 30.0 parts of crystallized copper sulfate and 40 parts of crystallized sodium acetate are added and the pH value of the metallization mixture is adjusted to 5.0–5.5 by means of diluted acetic acid. The mixture is stirred for 2 hours, at a temperature of 60° C. and evaporated in vacuo for isolating the complex copper dyestuff formed. The dyestuff obtained corresponding as free acid to the formula filtered, washed with potassium chloride solution and dried. It corresponds as free acid to the formula

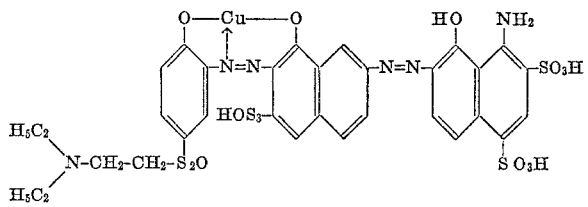

and produces on cellulose, in the presence of sodium hydroxide, a navy blue print, which is fast to light and washing.

EXAMPLE 12

47 parts of the complex copper disazo dyestuff corresponding to the formula

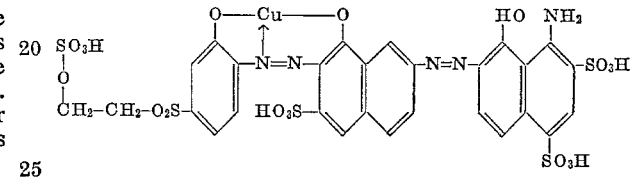

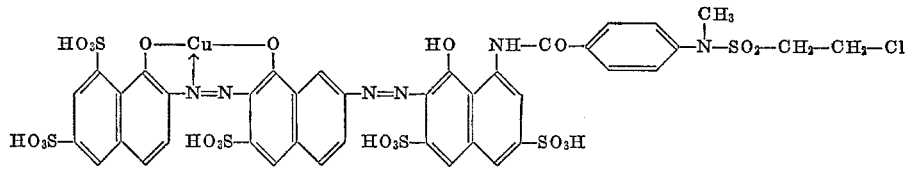

represents a dark blue powder soluble in water while producing a reddish blue colour. When fixing it on cotton, in the presence of sodium hydroxide, a full navy blue dyeing is obtained which is very fast to light and dry cleaning.

EXAMPLE 10

56.9 parts of the aminoazo dyestuff mentional in Example 9 are diazotized, as described therein, and coupled with 1[4'-(N-methyl-β-chloroethylsulfonylamino)-benzoylamino]-8-hydroxynaphthalene-3,6-disulfonic acid. After completion of the coupling 28.0 parts of crystallized cobalt sulfate and 30 parts of crystallized sodium acetate are added and the mixture is heated at the pH value of 6.1, for 2 hours, up to 80° C. The dyestuff is salted out, filtered off and dried. It represents the 2:1 complex cobalt compound of the dyestuff corresponding to the formula are dissolved, at a temperature of 50° C., in form of the potassium salt in 815 parts by volume of water and a sufficient amount of 2 N sodium hydroxide solution is quickly added to the solution in order to maintain a pH value of 11.5–12.0. The mixture is immediately adjusted, by means of acetic acid, to a pH value of 5.2–5.7 and 17 parts of sodium thiosulfate containing crystal water are added. The reaction mixture is stirred, for 6 hours, at 55°–65° C., whereby the pH value last indicated remains unchanged by continuing the dropwise addition of diluted acetic acid. The dyestuff solution is filtered while hot and finally evaporated in vacuo. A dark blue powder is obtained which is easily soluble in water while producing

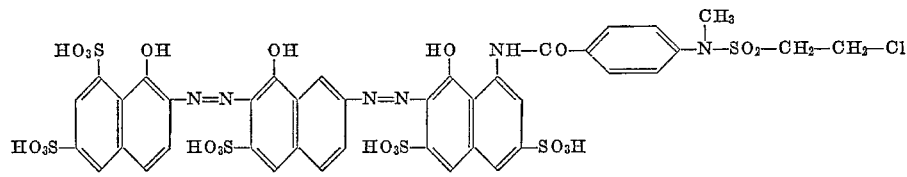

which produces on cotton, in the presence of sodium bicarbonate, a blue print which is fast to washing.

EXAMPLE 11

47 parts of the complex copper disazo dyestuff, which is obtained according to Example 1, paragraph (d), are dissolved, at 50° C., in form of the potassium salt, in 745 parts by volume of water. 10 parts of diethylamine are added dropwise at 40°–50° C. Now the mixture is stirred, for 16–20 hours, at 20°–40° C. and subsequently adjusted, by means of diluted acetic acid, to the pH value of 6.0. The dyestuff formed is salted out with potassium chloride, a reddish blue colour. As free acid the dyestuff corresponds to the formula

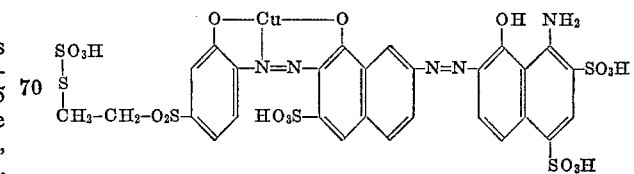

and produces on cellulose fibers, in the presence of sodium hydroxide, a full navy blue dyeing, which has good fastnesses to wetting and light.

EXAMPLE 13

0.1 mol of the disazo dyestuff obtained from the diazotized aminoazo dyestuff corresponding to the formula

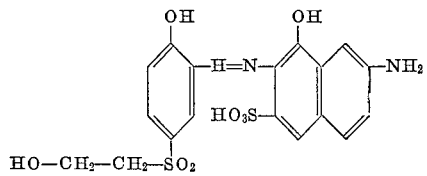

by acid coupling with 1-amino-8-hydroxynaphthalene-2,4-disulfonic acid are slowly introduced as finely ground potassium salt into 634 parts of concentrated surfuric acid and stirred, for several hours, at room temperature until entire dissolution sets in. The mixture is poured with stirring on 1,850 parts of ice, the esterified dyestuff corresponding to the formula

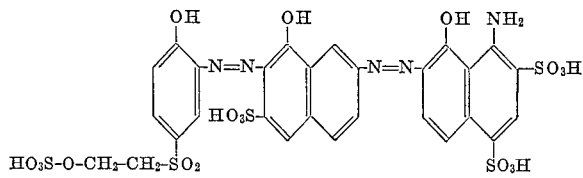

is salted out by adding potassium chloride and filtered off with suction.

The moist filter cake is washed with potassium chloride solution, until no acid reaction is observed and then dried in vacuo at 60°–70° C.

When fixing the dyestuff on cotton or cellulose, in the presence of an acid-binding agent, and subsequently treating the dyeing on the fiber with an acetic copper sulfate solution, a navy blue dyeing fast to washing is obtained, which is identical with the dyeing obtained according to Example 2, paragraph (a).

EXAMPLE 14

0.1 mol of the complex copper disazo dyestuff obtained from the diazotized aminoazo dyestuff corresponding to the formula

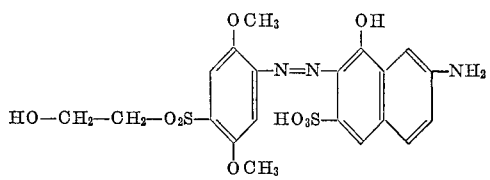

by coupling with 1-acetylamino-8-hydroxynaphthalene-3,6-disulfonic acid and subsequent demethylating coppering are introduced as finely ground potassium salt into 900 parts by volume of anhydrous pyridine and, after adding 8 parts of urea, heated to 85° C. At this temperature, 40 parts of amidosulfonic acid are introduced successively and the esterification mixture is then heated, for about 1 hour, to 100°–105° C. Thereafter, about 500 parts by volume of pyridine are distilled off in vacuo and, after cooling, the concentrated solution is poured into 2,200 parts by volume of water. By cautiously adding diluted hydrochloric acid, the mixture is weakly acidified and then saturated with potassium chloride. The dyestuff salted out corresponding to the formula

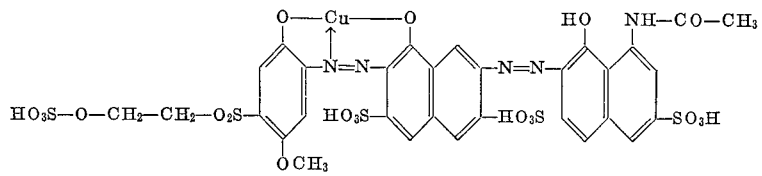

is isolated an dried as usual. A dark blue powder is obtained which, in the presence of sodium carbonate, yields reddish blue dyeings on cellulose fibers. These dyeings are fast to light and washing.

The dyestuffs listed in the following table can be prepared in a manner similar to that described in the preceding examples. They also produce on cellulose materials dyeings and prints with the same good fastnesses mentioned before.

The Roman notation numerals given in the table mean that, for the preparation of the dyestuffs according to the invention as medium component either 3-amino-5-hydroxy-naphthalene-7-sulfonic acid (I) or 3-amino-5-hydroxynaphthalene-2,7-disulfonic acid (II) have been used.

| Diazo component | Medium component | Coupling component | Metal | Shade |
|---|---|---|---|---|
| (1) 2-amino-1-hydroxybenzene-4-β-hydroxyethylsulfone-sulfuric acid ester. | (I) | 1-acetylamino-8-hydroxynaphthalene-3,6-disulfonic acid. | Cu | Navy blue. |
| (2) 2-amino-1-hydroxybenzene-4-β-hydroxyethylsulfone-sulfuric acid ester. | (I) | 2-hydroxynaphthalene-6,8-disulfonic acid | Cu | Do. |
| (3) 2-amino-1-hydroxybenzene-4-β-hydroxyethylsulfone-sulfuric acid ester. | (II) | do | Cr | Grey. |
| (4) 2-amino-1-hydroxybenzene-4-β-hydroxyethylsulfone-sulfuric acid ester. | (II) | 1-hydroxynaphthaline-5-sulfonic acid | Cr | Do. |
| (5) 2-amino-1-hydroxybenzene-4-β-hydroxyethylsulfone-sulfuric acid ester. | (II) | do | Cu | Violet. |
| (6) 2-amino-anisol-4-sulfonic acid | (I) | 1-[4'-(N-methyl-β-chloroethylsulfonylamino)-benzoylamino]-8-hydroxynaphthalene-3,6-disulfonic acid. |  | Do. |
| (7) 2-amino-1-hydroxybenzene-5-β-hydroxyethylsulfone-sulfuric acid ester. | (II) | 1-amino-8-hydroxynaphthalene-2,4-disulfonic acid | Cu | Navy blue. |
| (8) 2-amino-1-hydroxybenzene-4-β-hydroxyethylsulfone-sulfuric acid ester. | (I) | 1-hydroxynaphthalene-3,6-disulfonic acid | Cu | Do. |
| (9) 2-amino-1-hydroxybenzene-4-β-hydroxyethylsulfone-sulfuric acid ester. | (I) | 1-benzoylamino-8-hydroxynaphthalene-3,6-disulfonic acid. | Cu | Do. |
| (10) 2-amino-1-hydroxybenzene-5-β-hydroxyethylsulfone-sulfuric acid ester. | (I) | do | Cu | Do. |
| (11) 2-amino-1-hydroxybenzene-5-β-hydroxyethylsulfone-sulfuric acid ester. | (I) | do | Cr | Blue-grey. |
| (12) 2-amino-1-hydroxybenzene-4-β-hydroxyethylsulfone-thiosulfuric acid ester. | (I) | 1-amino-8-hydroxynaphthalene-2,4-disulfonic acid | Cu | Navy blue. |
| (13) 2-amino-1-hydroxybenzene-4-β-dimethylaminoethyl-sulfone. | (I) | do | Cu | Do. |
| (14) 2-amino-1-hydroxybenzene-4-β-hydroxyethylsulfone-sulfuric acid ester. | (I) | 1-vinylsulfonylamino-8-hydroxynaphthalene-3,6-disulfonic acid. | Cu | Do. |
| (15) 2-amino-1-hydroxy-4-methoxybenzene-5-β-hydroxyethylsulfone-sulfuric acid ester. | (I) | 1-hydroxynaphthalene-4-β-hydroxyethylsulfone-sulfuric acid ester. | Cu | Do. |
| (16) 2-amino-1-hydroxybenzene-4-β-diethylaminoethyl-sulfone. | (I) | 1-(β-diethylaminoethylsulfonylamino)-8-hydroxy-naphthalene-3,6-disulfonic acid. | Cu | Do. |
| (17) 2-amino-1-hydroxy-4-methoxy-benzene-5-β-hydroxylethylsulfone-sulfuric acid ester. | (I) | 1-hydroxynaphthalene-4-β-hydroxyethylsulfone-thiosulfuric acid ester. | Cu | Do. |

TABLE—Continued

| Diazo component | Medium component | Coupling component | Metal | Shade |
|---|---|---|---|---|
| (18) 2-amino-1-hydroxybenzene-4-β-acetoxyethylsulfone | (I) | 1-acetylamino-8-hydroxynaphthalene-3,6-disulfonic acid. | Cu | Do. |
| (19) 2-amino-1-hydroxy-4-(N-methylthionylamino)-benzene. | (I) | do | Cu | Do. |
| (20) 2-amino-6-nitro-1-hydroxybenzene-4-β-hydroxy-ethylsulfone-sulfuric acid ester. | (I) | 1-amino-8-hydroxynaphthalene-2,4-disulfonic acid | Cu | Do. |
| (21) 2-amino-1-hydroxybenzene-4-β-hydroxyethylsulfone-sulfuric acid ester. | (I) | 1-aminonaphthalene 4 sulfonic acid | Cr | Grey. |
| (22) 2 amino-1-hydroxybenzene-4-β-hydroxyethylsulfone-sulfuric acid ester. | (I) | 1-benzoylamino-8-hydroxynaphthalene-3,6-disulfonic acid. | Cr | Bluish-grey. |
| (23) 2-amino-1-hydroxybenzene-5-β-hydroxyethylsulfone-sulfuric acid ester. | (I) | 1-hydroxynaphthalene-3,6-disulfonic acid | Cr | Do. |
| (24) 2-amino-1-hydroxynaphthalene-6,8-disulfonic acid | (I) | 1-[4'-(N-methyl-β-chlorethylsulfonylamino)-benzoylamino]-8-hydroxynaphthalene-3,6-disulfonic acid. | Cr | Grey. |
| (25) 2-amino-1-hydroxynaphthalene-4,8-disulfonic acid | (I) | do | Cu | Navy blue. |
| (26) 2-amino-1-hydroxy-4-(N-butyl-ethyionlamino)-benzene. | (I) | 1-amino-8-hydroxynaphthalene-2,4-disulfonic acid | Cu | Do. |
| (27) 2-amino-1-hydroxybenzene-4-sulfonic acid | (I) | 3-(N-ethylethionylamino)-5-hydroxynaphthalene-7-sulfonic acid. | Cu | Violet-blue. |
| (28) 2-amino-1-hydroxybenzene-4-β-phenoxyethylsulfone | (I) | 1-acetamino-8-hydroxynaphthalene-3,6-disulfonic acid. | Cu | Navy blue. |
| (29) 2-amino-1-hydroxybenzene-4-β-hydroxyethylsulfone-methylsulfonic acid ester. | (I) | 1-hydroxynaphthalene-5-sulfonic acid | Cu | Violet. |
| (30) 4-chloro-2-amino-1-hydroxybenzene | (II) | 1-vinylsulfonylamino-8-hydroxynaphthalene-3,6-disulfonic acid. | Cu | Navy blue. |
| (31) 3-amino-4-hydroxybenzene-carboxylic acid | (I) | do | Cu | Do. |
| (32) 2-amino-6-acetylamino-1-hydroxybenzene-4-sulfonic acid. | (I) | do | Cu | Do. |

EXAMPLE 15

(a) 54.2 parts of the aminoazo dyestuffs corresponding to the formula

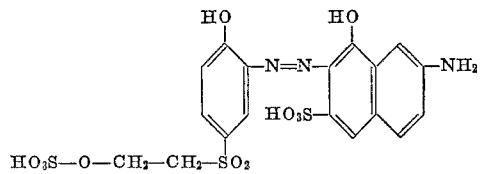

are introduced, in form of the sodium salt, into 550 parts by volume of water and 27.5 parts of crystallized copper sulfate and 20 parts of crystallized sodium acetate are added. The mixture is stirred, for 2 hours, at a temperature of 50°–60° C. (pH value 4.8), whereby a red-brown solution is formed. The complex copper dyestuff formed is salted out with 20% of potassium chloride (referred to the volume of the solution), filtered off and washed with potassium chloride solution.

(b). The dyestuff prepared according to paragraph (a) corresponding free acid to the formula

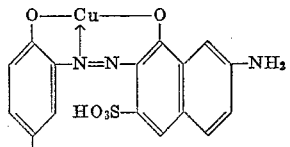

is dissolved, at a temperature of 70° C., in 600 parts by volume of water and 20 parts by volume of 5 N sodium nitrite solution are added. The dyestuff solution obtained is cooled to 20° C. and subsequently introduced dropwise into a mixture of 110 parts of ice powder and 35 parts by volume of acetic acid (pH value 4) which is vigorously stirred. Stirring is continued for 2 hours, at 0°–5° C. and the pH value is adjusted to 6 by introducing sodium carbonate. This mixture is combined with a neutralized solution of 31.9 parts of 1-amino-8-hydroxy-naphthalene-2,4-disulfonic acid in 200 parts by volume of water. The coupling is carried out at a pH value of 6.5–6.9 by introducing sodium carbonate and the disazo dyestuff formed is isolated by salting it out with potassium chloride. The disazo dyestuff corresponds as free acid to the formula

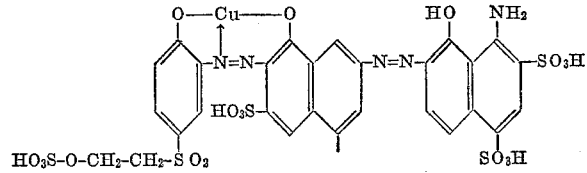

When fixing it on cotton or cellulose fibers, in the presence of alkaline agents for instance according to the so-called single bath pad-batch process, the dyestuff produces dyeings of deep navy blue tints which have good fastnesses to light and washing.

The aforesaid complex copper disazo dyestuff can be easily decoppered by treatment with a diluted mineral acid and subsequently converted, in known manner, into the complex metal compound of another metal.

EXAMPLE 16

(a) For conversion into the complex chromium compound, 54.2 parts of the aminoazo dyestuff corresponding to the formula

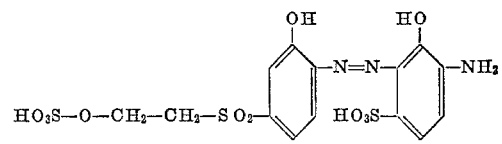

are dissolved in 1,310 parts by volume of water, 25 parts of chromium alum and 30 parts of crystallized sodium acetate are added (pH value 5.0). The mixture is boiled, for 11 hours, under reflux and thereafter cooled to 20° C. The complex chromium dyestuff is salted out with 20% of sodium chloride (referred to the volume of the solution), filtered off and washed with sodium chloride solution.

(b) The dyestuff obtained according to (a) corresponding as free acid to the formula

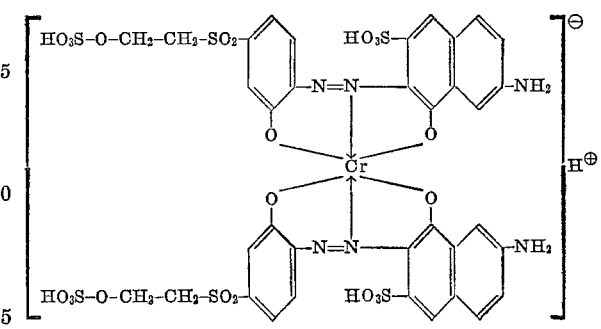

is dissolved in a mixture of 520 parts by volume of water and 20 parts by volume of 5 N sodium nitrite solution. This solution is poured, at 0°–10° C., into a mixture of 150 parts of ice powder and 20 parts by volume of concentrated hydrochloric acid. After completion of the diazotization the nitrous acid in excess is removed by means of amidosulfonic acid and the mixture is adjusted to the pH value of 6.0 by adding sodium bicarbonate.

The mixture obtained is combined at 5°–10° C., with a neutralized solution of 39.7 parts of 1-acetylamino-8-hydroxynaphthalene-3,6-disulfonic acid in 250 parts by volume of water. The coupling is carried out at a pH value of 6.0–7.0 and the 1:2 complex chromium disazo dyestuff is isolated by salting it out with 25% of sodium chloride (referred to the volume of the solution), by filtration and by drying in vacuo at 60° C.

A black blue powder is obtained containing the dyestuff of the following structure (b) The dyestuff obtained according to (a) corresponding as free acid to the formula

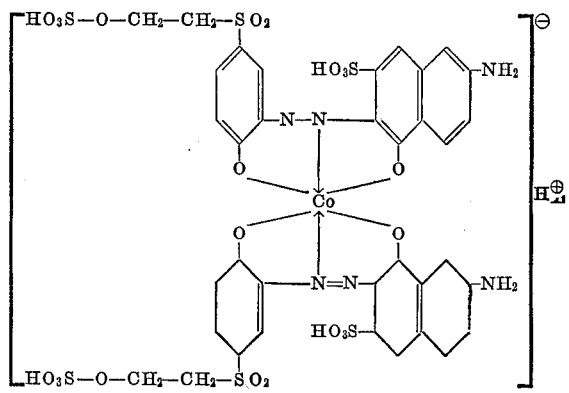

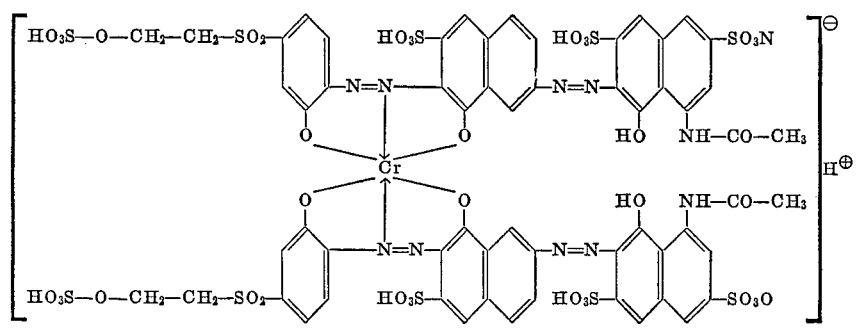

in the form of the sodium salt.

When fixing it on cotton, in the presence of sodium hydroxide, a blue-grey dyeing is obtained, which is fast to light and washing.

EXAMPLE 17

(a) 54.2 parts of the aminoazo dyestuff of the formula mentioned in Example 15(a) are dissolved, in the form of the sodium salt at 80°–90° C., in 600 parts by volume of water and 15.4 parts of crystallized cobalt sulfate and 13 parts of crystallized sodium acetate are added. The mixture is stirred, for 4 hours, at 70°–75° C., subsequently cooled to 10° C. and saturated with potassium chloride. The dyestuff precipitated is filtered off and washed with potassium chloride solution.

is dissolved in a mixture of 610 parts by volume of water and 20 parts by volume of 5 N sodium nitrite solution. This solution is allowed to run, at 0°–10° C., into a mixture of 150 parts of ice powder and 20 parts by volume of concentrated hydrochloric acid. After completion of the diazotization, the nitrous acid in excess is removed by adding amidosulfonic acid and the mixture is neutralized to the pH value of 6.0 means of sodium bicarbonate. The solution of the tetrazotized complex cobalt dyestuff is combined with a neutralized solution of 31.9 parts of 1-amino-8-hydroxynaphthalene-2,4-disulfonic acid in 100 parts by volume of water. After completion of the coupling (pH value 6.0 to 6.5), the dyestuff formed may be isolated by saturating the solution with potassium chloride or by spray drying.

Hereby, a dark salt-containing powder is obtained, containing the dyestuff of the structure

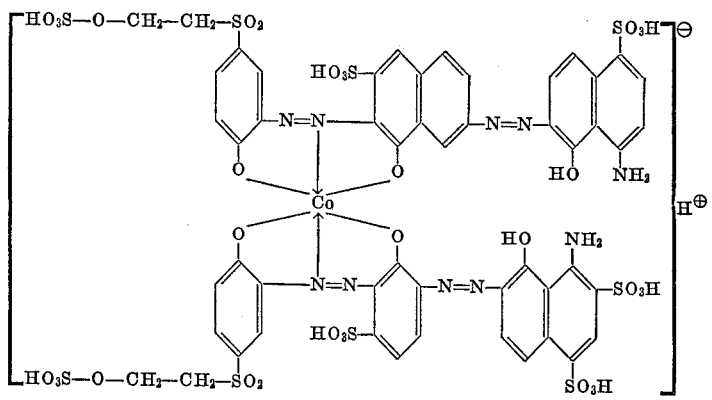

in form of the potassium salt. When fixing it on cotton, in the presence of sodium carbonate, a dark blue print is obtained, which is very fast to dry cleaning and washing.

The dyestuffs listed in the following table can be prepared in a manner similar to that described in Examples 15 to 17. They also produce on cellulose materials dyeings and prints with the same good fastnesses mentioned before.

The Roman notation numerals given in the table mean that, for the preparation of the dyestuffs according to the invention as medium component either 3-amino-5-hydroxy-naphthalene-7-sulfonic acid (I) or 3-amino-5-hydroxynaphthalene-2,7-disulfonic acid (II) have been used.

droxy-phenylureido-disulfo-naphthylene, X is linked in a position other than ortho to the azo groups and is a group of the formula

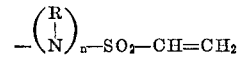

or

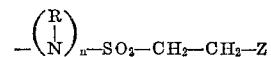

| Diazo component | Medium component | Coupling component | Metal | Shade |
|---|---|---|---|---|
| (1) 2-amino-1-hydroxybenzene-4-β-hydroxyethylsulfone-sulfuric acid ester. | (I) | 1-acetylamino-8-hydroxynaphthalene-3,6-disulfonic acid. | Cu | Navy blue. |
| (2) 2-amino-1-hydroxybenzene-4-β-hydroxyethylsulfone-sulfonic acid ester. | (I) | 1,3-dihydroxybenzene. | Cr | Greyish-brown. |
| (3) 2-amino-1-hydroxybenzene-4-β-hydroxyethylsulfone-sulfuric acid ester. | (II) | 2-hydroxynaphthalene-6,8-disulfonic acid. | Cr | Grey. |
| (4) 2-amino-1-hydroxybenzene-4-β-hydroxyethylsulfone-sulfuric acid ester. | (II) | 1-hyrdoxynaphthalene-5-sulfonic acid. | Cr | Do. |
| (5) 2-amino-1-hydroxybenzene-5-β-hydroxyethylsulfone-sulfuric acid ester. | (II) | 1-amino-8-hydroxynaphthalene-2,4-disulfonic acid. | Cu | Navy blue. |
| (6) 2-amino-1-hydroxybenzene-5-β-hydroxyethylsulfone-sulfuric acid ester. | (I) | 1-acetylamino-8-hydroxynaphthalene-3,6-disulfonic acid. | Cr | Bluish-grey. |
| (7) 2-amino-1-hydroxybenzene-4-β-hydroxyethylsulfone thiosulfuric acid ester. | (I) | 1-amino-8-hydroxynaphthalene-2,4-disulfonic acid. | Cu | Navy blue. |
| (8) 2-amino-1-hydroxybenzene-4-β-dimethylaminoethyl-sulfone. | (I) | 1-amino-8-hydroxynaphthalene-2,4-disulfonic acid. | Cu | Do. |
| (9) 2-amino-1-hydroxybenzene-4-β-hydroxyethylsulfone-sulfuric acid ester. | (I) | 1-vinylsulfonylamino-8-hydroxynaphthalene-3,6-disulfonic acid. | Cu | Do. |
| (10) 2-amino-1-hydroxy-4-methoxybenzene-5-β-hydroxy ethylsulfone-sulfuric acid ester. | (I) | 1-hydroxynaphthalene-4-β-hydroxyethylsulfone-sulfuric acid ester. | Cu | Do. |
| (11) 2-amino-1-hydroxybenzene-4-β-diethylaminoethyl-sulfone. | (I) | 1-(β-diethylaminoethylsulfonylamino)-8-hydroxy-naphthalene-3,6-disulfonic acid. | Cu | Do. |
| (12) 2-amino-1-hydroxybenzene-4-β-acetoxyethylsulfone. | (I) | 1-acetylamino-8-hydroxynaphthalene-3,6-disulfonic acid. | Cu | Do. |
| (13) 2-amino-1-hydroxy-4-(N-methylethionylamino)-benzene. | (I) | ----do---- | Cu | Do. |
| (14) 2-amino-6-nitro-1-hydroxybenzene-4-β-hydroxy-ethylsulfone-sulfuric acid ester. | (I) | 1-amino-8-hydroxynaphthalene-2,4-disulfonic acid. | Cu | Do. |
| (15) 2-amino-1-hydroxynaphthalene-6,8-disulfonic acid. | (I) | 1-[4'-(N-methyl-β-chlorethylsulfonylamino)-benzoylamino]-8-hydroxynaphthalene-3,6-disulfonic acid. | Cr | Grey. |
| (16) 2-amino-1-hydroxynaphthalene-4,8-disulfonic acid. | (I) | ----do---- | Cu | Navy blue. |
| (17) 2-amino-1-hydroxy-4-(N-butylethionylamino)-benzene. | (I) | 1-amino-8-hydroxynaphthalene-2,4-disulfonic acid. | Cu | Do. |
| (18) 2-amino-1-hydroxybenzene-4-sulfonic acid. | (I) | 3-(N-ethyl-ethionylamino)-5-hydroxynaphthalene-7-sulfonic acid. | Cu | Violet blue. |
| (19) 2-amino-1-hydroxybenzene-4-β-phenoxyethylsulfone. | (I) | 1-acetamino-8-hydroxynaphthalene-3,6-disulfonic acid. | Cu | Navy blue. |
| (20) 4-chloro-2-amino-1-hydroxybenzene. | (II) | 1-vinylsulfonylamino-8-hydroxynaphthalene-3,6-disulfonic acid. | Cu | Do. |
| (21) 2-amino-1-hydroxybenzene-4,6-disulfonic acid. | (I) | ----do---- | Cu | Do. |
| (22) 2-amino-1-hydroxynaphthalene-6,8-disulfonic acid. | (I) | 1-[4'-(N-methyl-β-chlorethylsulfonylamino)-benzoylamino]-8-hydroxynaphthalene-3,6-disulfonic acid. | Cu | Do. |

I claim:
1. A complex copper, cobalt or chromium compound of a disazo dyestuff of the formula

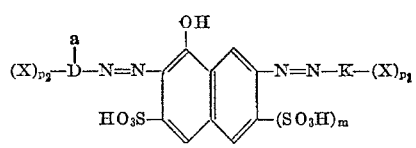

wherein D is phenylene, nitro-phenylene, chloro-phenylene, lower alkyl-phenylene, lower alkoxy-phenylene, carboxy-phenylene, monosulfo-phenylene, disulfo-phenylene, lower alkoxy-monosulfo-phenylene, acetylamino-monosulfo-phenylene, naphthalene, monosulfo-naphthylene or disulfo-naphthylene, K is dihydroxy-phenylene, hydroxy-naphthylene, hydroxy - monosulfo - naphthylene, amino-monosulfo-naphthylene, hydroxy-disulfo-naphthylene, hydroxy-amino-monosulfo - naphthylene, hydroxy - amino-disulfo-naphthylene, hydroxy-acetylamino-disulfo-naphthylene, hydroxy-benzoylamino-disulfo-naphthylene or hydroxy-phenylureido-disulfo-naphthylene, X is linked in a position other than ortho to the azo groups and is a group of the formula or in which R is hydrogen or lower alkyl, Z is —Cl, —O—SO₃H, —S—SO₃H, —N(lower alkyl)₂,

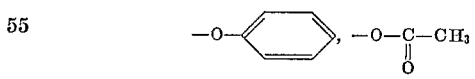

—O—SO₂—lower alkyl,

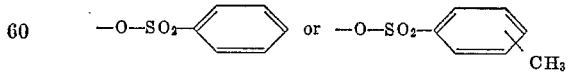

$a$ is linked in ortho-position to the azo group and is hydroxy or carboxy, $m$, $n$, $p_1$ and $p_2$ each stands for an integer 0 or 1, the sum of $p_1$ and $p_2$ being at least 1, and the dyestuff is a symmetric 1:2-cobalt or chromium complex compound or a 1:1-copper complex compound.

2. The dyestuff of the formula

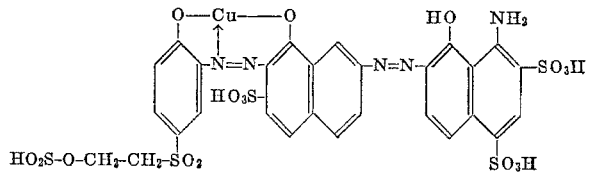

3. The dyestuff of the formula
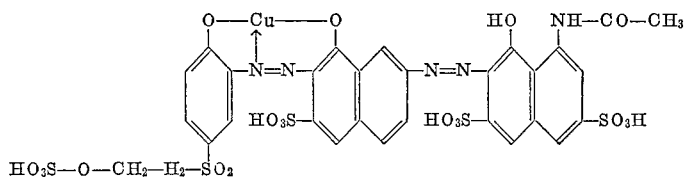
4. The dyestuff of the formula
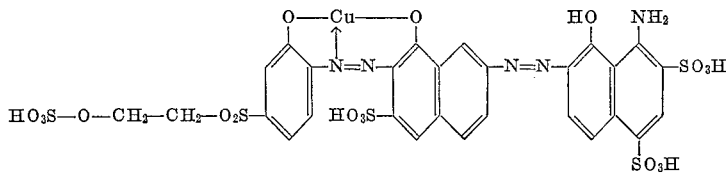
5. The dyestuff of the formula
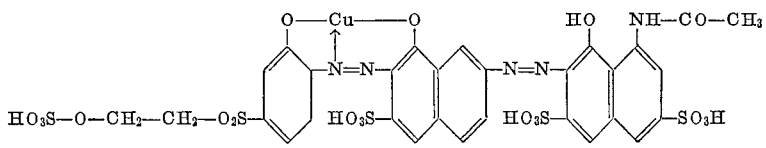
6. The dyestuff of the formula
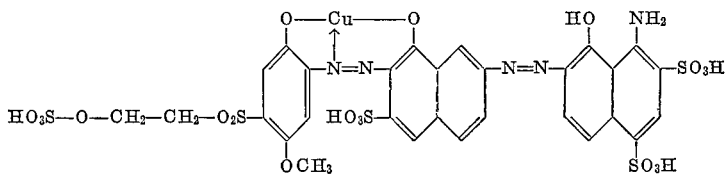
7. The dyestuff of the formula
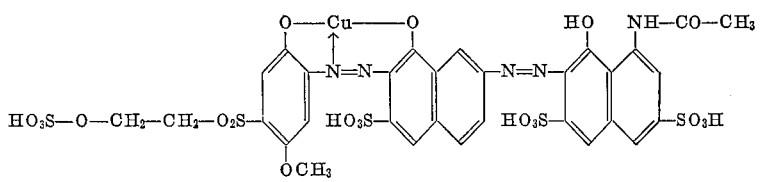
References Cited
UNITED STATES PATENTS
3,364,194  1/1968  Meininger et al. _____ 260—148
FLOYD D. HIGEL, Primary Examiner
DONALD M. PAPUGA, Assistant Examiner
U.S. Cl. X.R.
8—42, 51, 54; 260—37, 151, 187, 189, 190, 191, 194, 198, 458, 507

PO-1050
(5/69)

UNITED STATES PATENT OFFICE
CERTIFICATE OF CORRECTION

Patent No. 3,457,251          Dated July 22, 1969

Inventor(s) Fritz Meininger

It is certified that error appears in the above-identified patent and that said Letters Patent are hereby corrected as shown below:

In the title: "DIAZO" should read --DISAZO--. Column 1, line 18, --and-- should appear after the formula; line 23, "and" should be deleted; lines 45 to 49, the right hand portion of the formula should appear as follows:

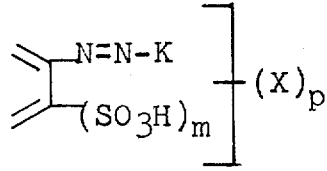

line 55, the period (.) should be a comma (,); line 57, "benzen" should read --benzene--; line 65, there should be a comma (,) after "K". Column 2, line 5, "to" should read --or--; line 16, the formula

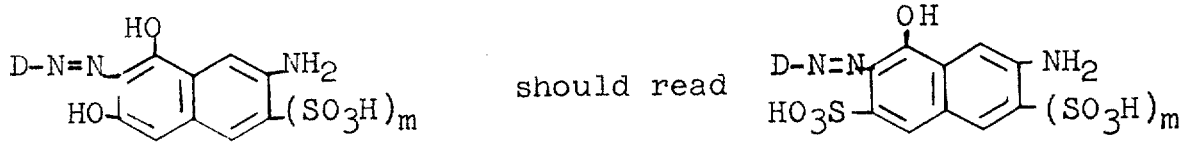

Column 2, line 49, "Formulas" should read --Formulae--.
Column 4, line 5, "nnown" should read --known--; line 26, "nitrate" should read --nitrite--. Column 5, line 23, "metallizatiton mixtures" should read --metallization mixture--; line 35, the structural formula should read:

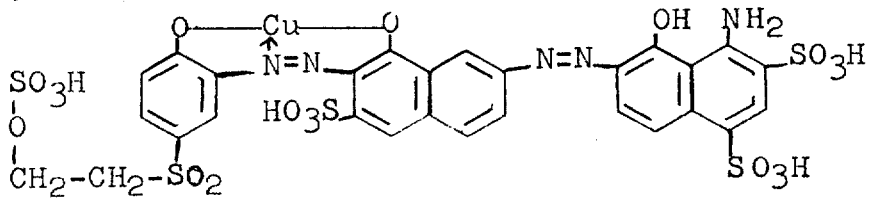

Column 6, line 5, the portion of the formula reading

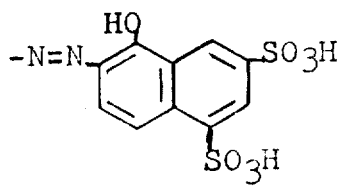    should read    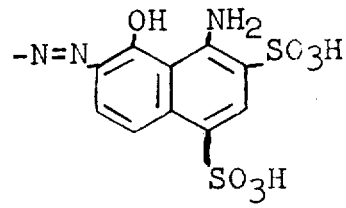

Column 8, line 58, "olution" should read --solution--.
Column 9, line 42, "60%" should read --60°C.--.  Column 10, line 18, the portion of the formula reading

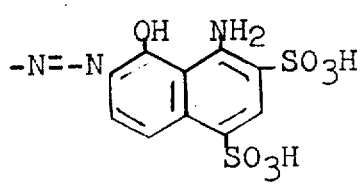    should read    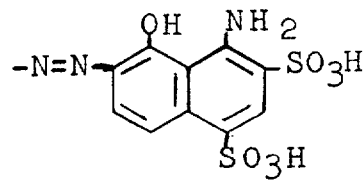

line 60, the portion of the formula reading

    should read    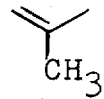

line 70, the portion of the formula reading HO₂S should read HO₃S .  Column 11, line 42, "mentional" should read --mentioned--
Column 12, line 7, the portion of the formula reading HOS₃- should read HO₃S- ; line 9, the portion of the formula reading -S₂O should read -SO₂; line 68, the portion of the formula reading

    should read    

Column 14, line 32, the portion of the formula reading

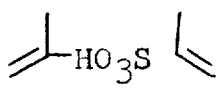    should read    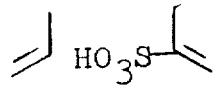

Column 15, line 26, "dyestuffs" should read --dyestuff--;

Column 15, line 74, the portion of the formula reading

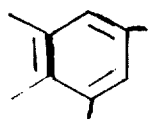   should read   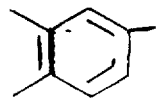

Column 16, line 43, the portion of the formula reading

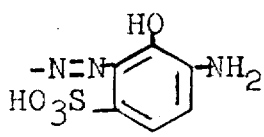   should read   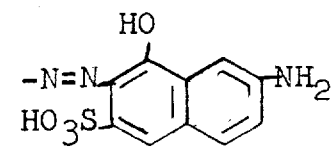

line 73, the portion of the formula reading

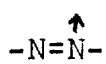   should read   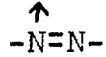

Column 17, line 24, the portion of the formula reading $-SO_3N$ should read $-SO_3H$ ; line 34, the portion of the formula reading $-SO_3O$ should read $-SO_3H$ . Column 18, lines 5 to 7, the portion of the formula reading

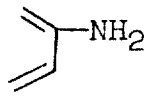   should read   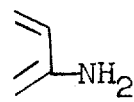

line 7, the portion of the formula reading

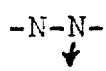   should read   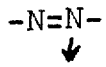

lines 14 to 16, the portion of the formula reading

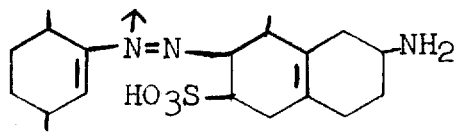

should read

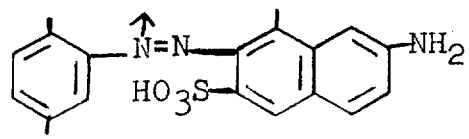

Column 18, line 64, the portion of the formula reading

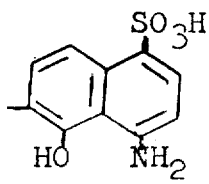 should read 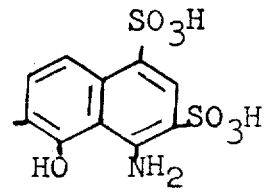

lines 80 to 83, the portion of the formula reading

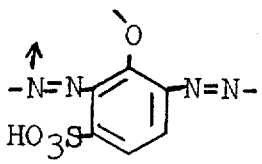 should read 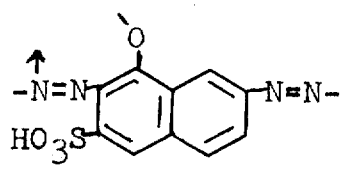

Column 19, line 69, "naphthalene" should read --naphthylene--.
Column 20, line 52, "or" (first occurence) should be deleted;
line 73, the portion of the formula reading

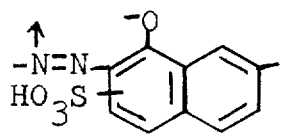 should read 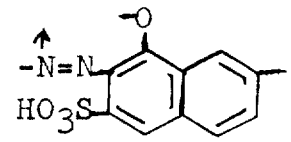

line 75, the portion of the formula reading $HO_2S-$ should read $HO_3S-$ . Column 21, claim 3, the portion of the formula reading

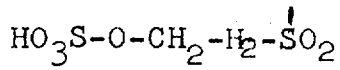 should read 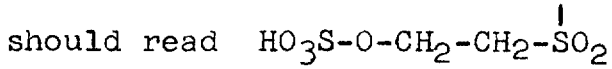

Column 21, claim 5, the portion of the formula reading

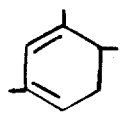 should read 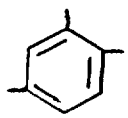

Column 21, claim 6, the portion of the formula reading

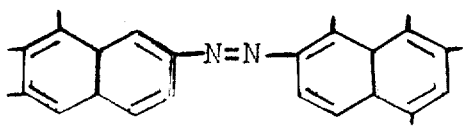 should read 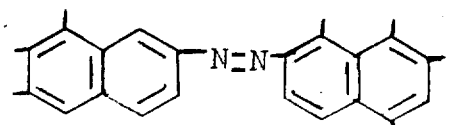

Signed and sealed this 5th day of May 1970.

(SEAL)
Attest:
EDWARD M. FLETCHER, JR.
Attesting Officer

WILLIAM E. SCHUYLER, JR.
Commissioner of Patents